March 14, 1950  H. C. REYNOLDS  2,500,571
REVERSING MECHANISM FOR ELECTRIC MOTORS
Filed April 26, 1947
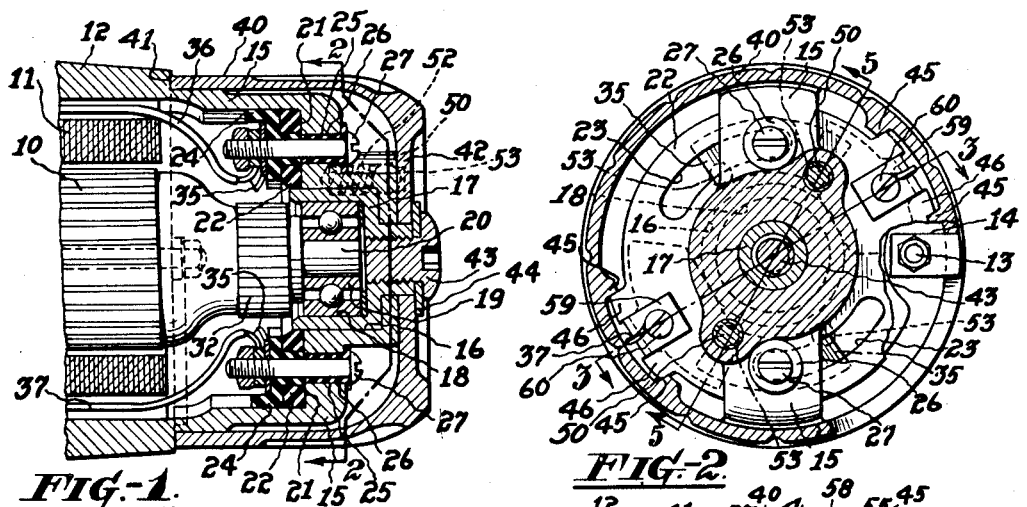
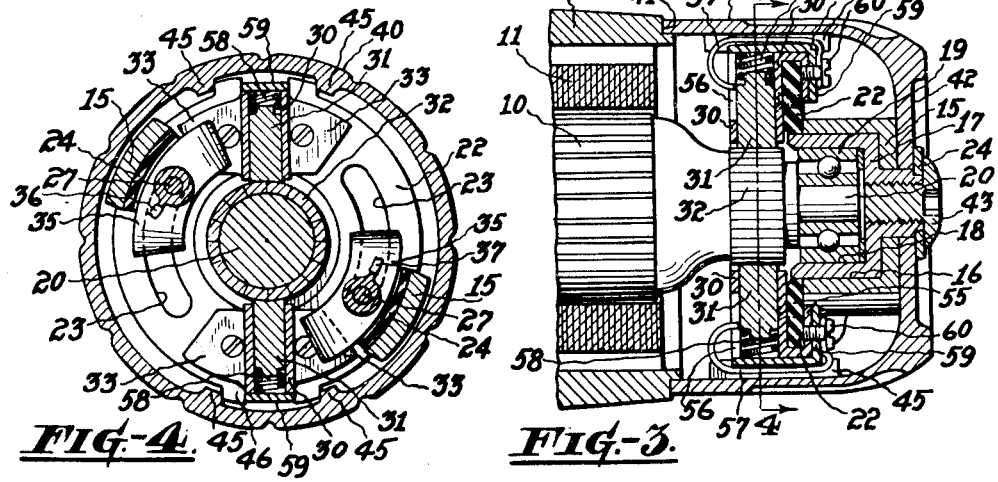
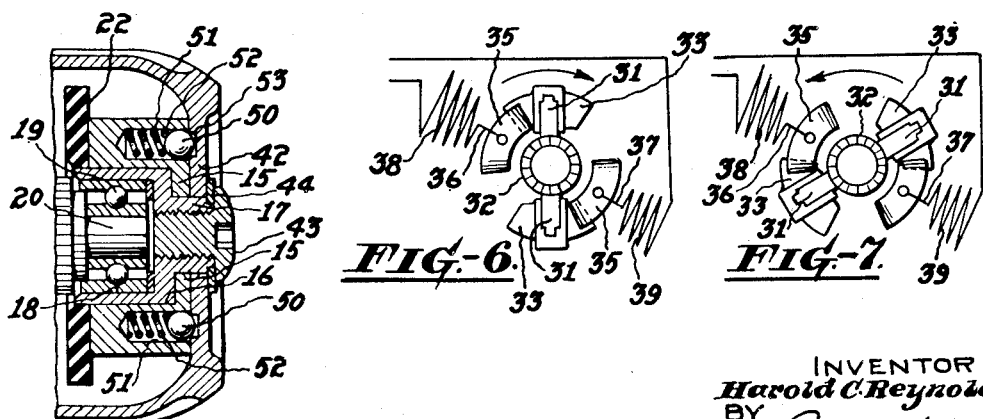
INVENTOR
Harold C. Reynolds.
BY
HIS ATTORNEY.

Patented Mar. 14, 1950

2,500,571

UNITED STATES PATENT OFFICE 2,500,571

REVERSING MECHANISM FOR ELECTRIC MOTORS

Harold C. Reynolds, Athens, Pa., assignor to Ingersoll-Rand Company, New York, N. Y., a corporation of New Jersey Application April 26, 1947, Serial No. 744,170

5 Claims. (Cl. 171—318)

This invention relates to electric motors and more particularly to motors which are adapted to operate in either direction of rotation of the armature. More particularly the invention relates to reversible motors of the direct current or universal type.

It is an object of this invention to provide an arrangement wherein the necessary changes in current flow through the field and armature are effected by a switch which also changes the position of the brushes so as to minimize sparking at the commutator.

Another object of the invention is to provide a convenient grip for the switch mechanism.

Still another object of the invention is to provide an efficient, durable and inexpensive switch arrangement for a motor of the type referred to.

Other objects and advantages of the invention will be in part obvious and in part pointed out hereinafter.

In the drawing in which similar reference characters refer to similar parts,

Figure 1 is a longitudinal section through a universal electric motor constructed in accordance with the practice of the invention, only a portion of the casing, field, and armature being shown, Figure 2 is a section of the motor taken along the line 2—2 of Fig. 1 looking in the direction of the arrows, Fig. 3 is a longitudinal section of a portion of the motor taken along the line 3—3 of Fig. 2 looking in the direction of the arrows, Figure 4 is a transverse section of the motor taken along the line 4—4 of Fig. 3 looking in the direction of the arrows, Figure 5 is a longitudinal section of the motor taken along the line 5—5 of Fig. 2 looking in the direction of the arrows, Figure 6 is a circuit diagram of the motor showing the switch connections and brushes in position to effect clockwise rotation of the motor, and Figure 7 is a circuit diagram of the motor showing the switch and brushes in position to effect counter-clockwise rotation of the motor.

The motor consists of a conventional armature 10 and field 11 mounted in a housing or frame 12. In this instance the field is held in position in the frame 12 by means of suitable bolts 13 passing through the field pieces and holding them against ears 14 formed on frame 12.

Frame 12 is provided with a pair of endwise extending arms 15 terminating in a socket 16 which is adapted to receive and act as a support for a bushing 17. The bushing 17 is provided with a bore 18 to receive an anti-friction bearing 19 for the end of the armature shaft 20. Adjacent socket 16 arms 15 are provided with plane portions 21 forming a bearing for a carrier member 22 in the form of a ring of insulation material. The carrier 22 is adapted to rotate with respect to the arms 15 and to this end is provided with arcuate slots 23 through which extend bushings 24 of insulation material bearing against the plane faces 21. Apertures 25 in the arms 15 register with the bushings 24 and are provided with flanged insulating bushings 26. Bolts 27 pass through the bushings 26 and 24 to hold these bushings in place with a slight clearance to permit the carrier 22 to rotate freely.

Upon the carrier 22 are mounted a pair of brush holders 30 diametrically opposed to each other, supporting the brushes 31 and are adapted to contact the commutator 32 of armature 10. Integrally formed with and extending radially from the opposite sides each of the brush holders 30 are formed a pair of wings 33 which are adapted to act as switch blades. Under the nuts of the bolts 27 are provided a pair of corresponding switch contacts 35 extending co-axially with respect to carrier 22 and electrically connected in the motor circuit to suitable leads 36 and 37 of the motor field windings 38 and 39 respectively.

Rotation of the carrier 22 is effected by means of a cap 40 of generally cylindrical form and bearing against the frame 12 at a shoulder 41 to form a substantially tight sliding joint therewith. The outer end of the cap 40 is formed by an inwardly extending flange 42 having an aperture fitting the end of bushing 17 and held thereon by means of a screw 43 and washer 44 with sufficient play to allow the cap 40 to be rotated without binding. On the interior of the cylindrical portion of cap 40 are provided spaced lugs 45 cooperating with outwardly extending lugs 46 on the carrier 22 coupling the cap 40 to the carrier and forcing them to rotate together.

The cap 40 is adapted to be releasably held in its operated positions by means of detents. In this instance the detents comprise a pair of balls 50 contained in bores 51 extending longitudinally in the socket end of the arms 15 and pressed outwardly by means of springs 52. The balls 50 are adapted to drop into corresponding notches 53 formed in the flange portion 42 of the cap.

The construction of the brush holders 30 and switch blades 33 is shown more particularly in Fig. 3. Each brush holder consists of a flat plate forming the blades 33 and having a bent over portion 55 to form a recess to receive the carrier 22. Brush holder portion 30 is formed integrally with blade portions 33 and is provided with a notch 56 into which is slidably introduced the lead 57 permanently attached to the brush 31. A spring 58 on the top of the brush 31 is held in place by a clip 59 screwed to the bent over portion 55 and extends over the end of the brush holder 30 to engage the spring. Screw 60 holding the clip 59 in place also serves as a means to form a good electrical contact between the lead 57 and the switch blades 33.

The function of the switch arrangement above described is diagrammatically illustrated in Figs. 6 and 7. The position of the brushes 31 and the switch blades 33 with respect to the stationary contacts 35 as shown in Fig. 6 is that which would produce clockwise rotation of the armature 10. For the reverse rotation the carrier 22 is adapted to be turned clockwise (Fig. 7) whereupon the brushes 31 assume a position reversing the direction of current flow through the armature 10 with respect to the field coils 38 and 39.

Thus by the above construction are accomplished among others the objects hereinbefore referred to.

I claim:

1. A reversible electric motor comprising a motor frame, an armature journaled in said frame and having a commutator, a carrier member rotatably mounted on the frame co-axial with respect to the armature, stationary switch contacts on the motor frame, brushes cooperative with the commutator mounted on the carrier, and switch blades on the carrier cooperative with such contacts alternatively upon rotation of said carrier to either extreme position.

2. A reversible electric motor comprising a motor frame, an armature journaled in said frame and having a commutator, a carrier member rotatably mounted on the frame co-axial with respect to the armature, stationary switch contacts on the motor frame, brushes cooperative with the commutator mounted on the carrier, switch blades on the carrier cooperative with such contacts alternatively upon rotation of said carrier to either extreme position, and a cap engaging said carrier and forming a closure for one end of the motor.

3. A reversible electric motor comprising a motor frame, an armature journaled in said frame and having a commutator, a carrier member rotatably mounted on the frame co-axial with respect to the armature, stationary switch contacts on the motor frame, brush holders mounted on the carrier, brushes cooperative with the commutator mounted in the carrier, switch blades mounted on and extending radially from said holder cooperative with such contacts alternatively upon rotation of said carrier, and a cap engaging said carrier providing a switch handle and forming a closure for one end of the motor.

4. A reversible electric motor comprising an armature having a commutator, a frame having endwise extending arms terminating in a bearing support for the armature, a carrier rotatable on said frame including a plate supported by said arms, brushes on said plate cooperative with said commutator, switch blades on said carrier, and stationary switch contacts on said arms cooperative with said blades only in both extreme positions of said carrier.

5. A reversible electric motor comprising a motor frame having a pair of arms extending endwise and terminating in a socket, said arms having a plane portion transverse to the axis of the frame, an armature in said frame having a bearing member, a bushing in said socket to receive said bearing, a carrier comprising a ring rotatably mounted on said plane portion of said arms, brushes mounted on said carrier cooperative with said armature, switch contacts on said carrier and rotatable therewith, stationary switch blades on said arms to be engaged by said contacts at the extreme rotational positions of said carrier, a cap rotatable on said arms and bushing and forming a substantially tight sliding joint with said frame, and inter-engaging means on said carrier and said cap to transmit rotation of the cap to the carrier.

HAROLD C. REYNOLDS.

REFERENCES CITED

The following references are of record in the file of this patent:

UNITED STATES PATENTS

| Number | Name | Date |
|---|---|---|
| 381,768 | Field | Apr. 24, 1888 |
| 1,268,330 | Darker | June 4, 1918 |
| 1,476,412 | Nies | Dec. 2, 1923 |
| 1,744,998 | Wisler | Jan. 28, 1930 |
| 1,856,146 | Wolkoff | May 3, 1932 |
| 2,099,554 | Bean | Nov. 16, 1937 |
| 2,274,480 | Jepson | Feb. 24, 1942 |